US009225577B2

(12) United States Patent
Shimizu

(10) Patent No.: US 9,225,577 B2
(45) Date of Patent: Dec. 29, 2015

(54) EXCITER AND QUADRATURE ERROR CORRECTION METHOD

(71) Applicant: Kabushiki Kaisha Toshiba, Minato-ku, Tokyo (JP)

(72) Inventor: Itsuhei Shimizu, Koganei Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/567,915

(22) Filed: Dec. 11, 2014

(65) Prior Publication Data

US 2015/0098522 A1 Apr. 9, 2015

Related U.S. Application Data

(63) Continuation of application No. PCT/JP2012/073708, filed on Sep. 14, 2012.

(30) Foreign Application Priority Data

Jun. 13, 2012 (JP) ................. 2012-133709

(51) Int. Cl.
*H04L 25/03* (2006.01)
*H04L 27/36* (2006.01)

(52) U.S. Cl.
CPC .................. *H04L 27/364* (2013.01)

(58) Field of Classification Search
CPC ............ H04L 27/368; H04L 25/03343; H03F 1/3247
USPC .................. 375/296, 224; 332/103, 144, 149; 455/323
See application file for complete search history.

(56) References Cited

U.S. PATENT DOCUMENTS

| 5,355,101 A | 10/1994 | Ichihara et al. |
| 5,748,623 A * | 5/1998 | Sawahashi et al. ........... 370/342 |
| 5,847,619 A | 12/1998 | Kirisawa |

(Continued)

FOREIGN PATENT DOCUMENTS

| JP | H05-130156 A | 5/1993 |
| JP | H09-247225 A | 9/1997 |

(Continued)

OTHER PUBLICATIONS

Lei Ding, et al., "Frequency-Dependent Modulator Imbalance in Predistortion Linearization Systems: Modeling and Compensation," Signals, Systems and Computers, 2003. Conference Record of the Thirty-Seventh Asilomar Conference on, vol. 1, Nov. 2003 (countryPublished), pp. 688-692.

(Continued)

*Primary Examiner* — Khai Tran
(74) *Attorney, Agent, or Firm* — Knobbe, Martens, Olson & Bear LLP

(57) ABSTRACT

According to one embodiment, an exciter comprises a sine wave generator, a filter, a digital/analog converter, and a quadrature modulator. The sine wave generator generates a first sine wave and a second sine wave while changing a frequency in a predetermined step at a preset time interval. The filter sets one of stored filter coefficients and performs filter processing for the first sine wave and the second sine wave. The digital/analog converter converts the first sine wave and the second sine wave after the filter processing into a first analog signal and a second analog signal, respectively. The quadrature modulator quadrature-modulates the first analog signal and the second analog signal.

5 Claims, 5 Drawing Sheets

(56) References Cited

U.S. PATENT DOCUMENTS

| | | |
|---|---|---|
| 6,836,227 B2 | 12/2004 | Asami |
| 7,872,544 B2 | 1/2011 | Miyashita |
| 8,396,173 B2 | 3/2013 | Ling et al. |
| 2004/0164889 A1 | 8/2004 | Asami |
| 2009/0088120 A1 | 4/2009 | Ling et al. |
| 2011/0032046 A1* | 2/2011 | Azarian ............... 332/103 |
| 2011/0051790 A1 | 3/2011 | Honda |
| 2011/0280410 A1* | 11/2011 | Matono et al. ............ 381/71.1 |

FOREIGN PATENT DOCUMENTS

| | | |
|---|---|---|
| JP | 2006-311056 A | 11/2006 |
| JP | 2007-116240 A | 5/2007 |
| JP | 2008-048292 A | 2/2008 |
| JP | 2008-232807 A | 10/2008 |
| JP | 2009-049771 A | 3/2009 |
| JP | 2010-541486 A | 12/2010 |
| JP | 2011-055271 A | 3/2011 |
| WO | WO 2004/077776 A1 | 9/2004 |
| WO | WO 2013/186942 A1 | 12/2013 |

OTHER PUBLICATIONS

International Search Report mailed by Japan Patent Office on Oct. 23, 2012 in the corresponding PCT application No. PCT/JP2012/073708—5 pages.

Concise Explanation for Japanese Patent Application 09-247225—1 page.

International Preliminary Report on Patentability issued by the International Bureau of WIPO on Dec. 16, 2015 in the corresponding PCT Application No. PCT/JP2012/073708—8 pages.

* cited by examiner

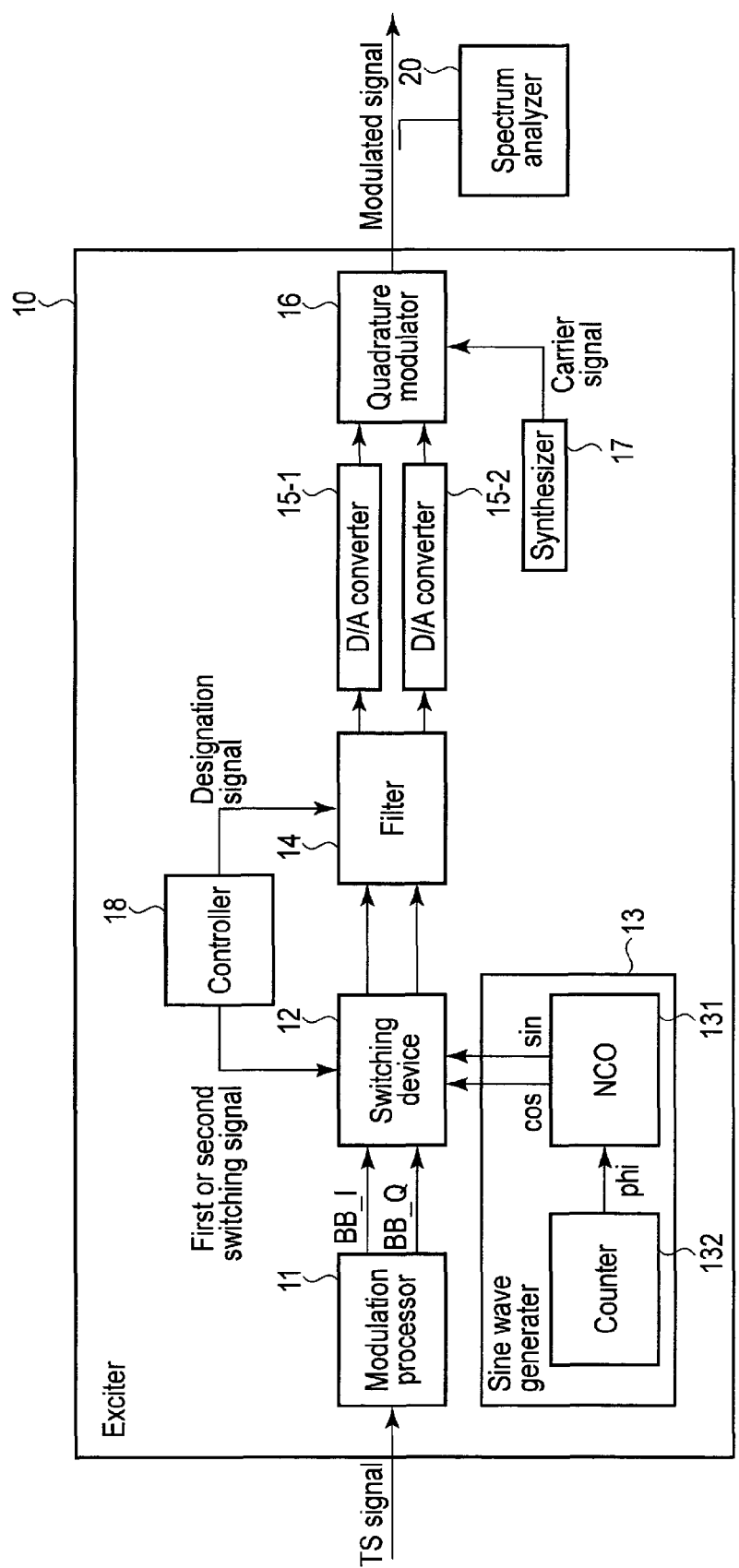
F I G. 1

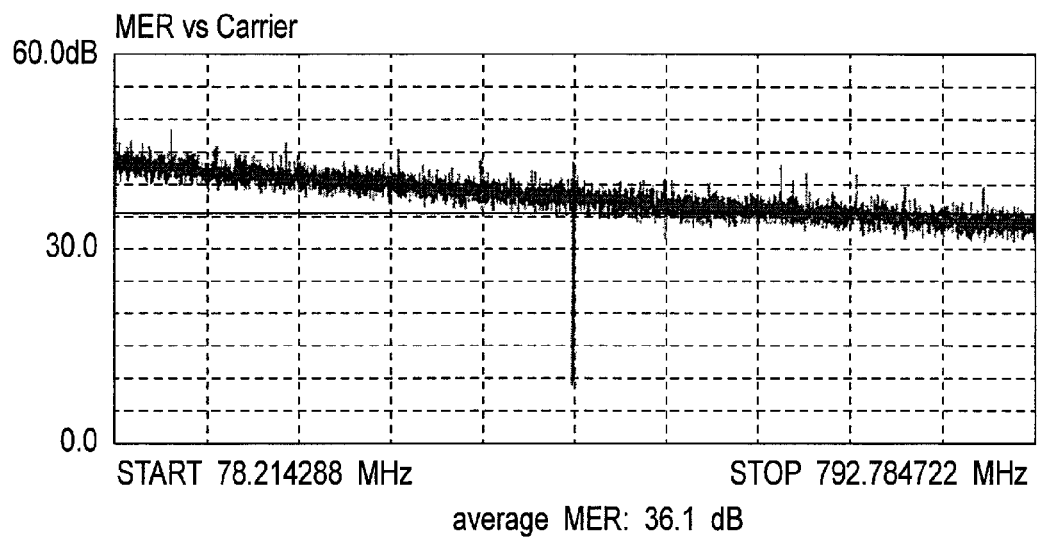
F I G. 6
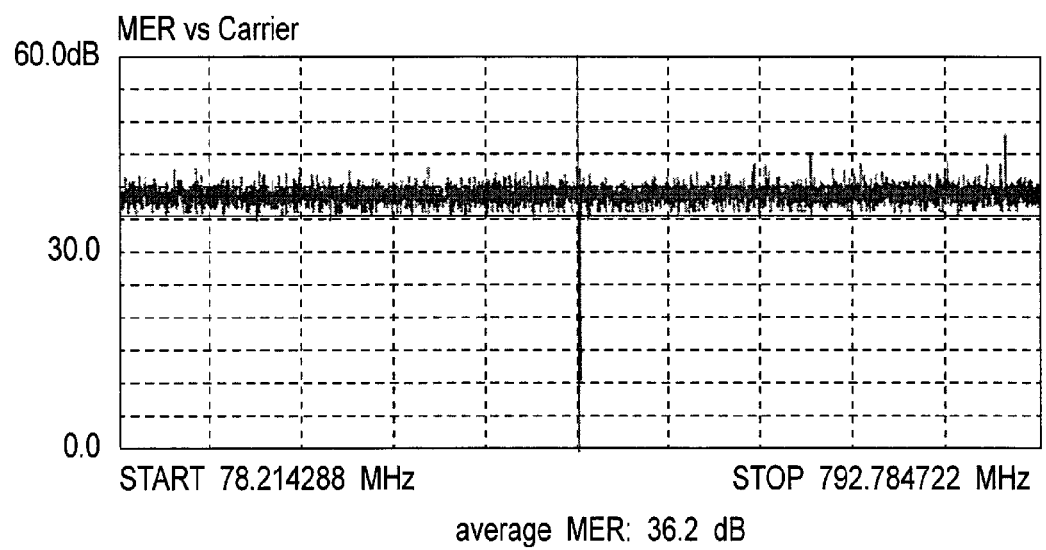
F I G. 7

EXCITER AND QUADRATURE ERROR CORRECTION METHOD

CROSS-REFERENCE TO RELATED APPLICATIONS

This application is a Continuation Application of PCT Application No. PCT/JP2012/073708, filed Sep. 14, 2012 and based upon and claiming the benefit of priority from prior Japanese Patent Application No. 2012-133709, filed Jun. 13, 2012, the entire contents of which are incorporated herein by reference.

FIELD

Embodiments described herein relate generally to an exciter used in a transmitter that employs a direct conversion method and a quadrature error correction method used by the exciter.

BACKGROUND

In the direct conversion method, IQ signals in the baseband are directly converted into RF (Radio Frequency) signals. At this time, signal quality may degrade due to the amplitude/phase error and DC offset of an analog quadrature modulator/demodulator. If the transmitter has DPD (Digital Pre-Distortion), the nonlinear distortion compensation performance of DPD may degrade due to the amplitude/phase error and DC offset of the analog quadrature modulator/demodulator. To avoid these problems, methods of estimating a quadrature error caused by the analog quadrature modulator/demodulator using digital signal processing have widely been examined.

When estimating a quadrature error, it is assumed to have no frequency dependence. However, when the EVM (Error Vector Magnitude) of the analog quadrature modulator/demodulator is actually measured, an image remaining due to a quadrature error is observed. The cause of the residual image is considered to be the frequency characteristic of the measurement system. Non-patent literature 1 introduces a method of estimating/correcting a quadrature modulator/demodulator error having frequency dependence (Frequency Dependent IQ Imbalance).

In current products, an image remains due to the frequency dependence of a quadrature error based on the skew difference between an I channel and a Q channel. The skew difference is about 100 psec, and it is difficult to suppress the skew difference by an analog circuit. Hence, the skew difference is corrected by digital signal processing. However, it is hard to measure a delay difference of 100 psec, and the MER (Modulation Error Ratio), EVM, or the like needs to be measured. For example, the ISDBT method uses a measuring device capable of measuring the MER on the carrier basis. It is possible to correct the skew difference using the frequency characteristic of the MER measured by the measuring device. However, only limited types of measuring devices can measure the frequency characteristic of the MER. Depending on the broadcast method, for example, CMMB, there exists no measuring device capable of measuring the MER on the carrier basis, and the skew difference cannot be corrected.

BRIEF DESCRIPTION OF THE DRAWINGS

FIG. 1 is a block diagram showing the functional arrangement of an exciter according to the embodiment;

FIG. 6 is a graph showing an MER measurement result in case where the skew difference is not corrected; and FIG. 7 is a graph showing an MER measurement result in case where the skew difference is corrected.

DETAILED DESCRIPTION

Figure 2A:
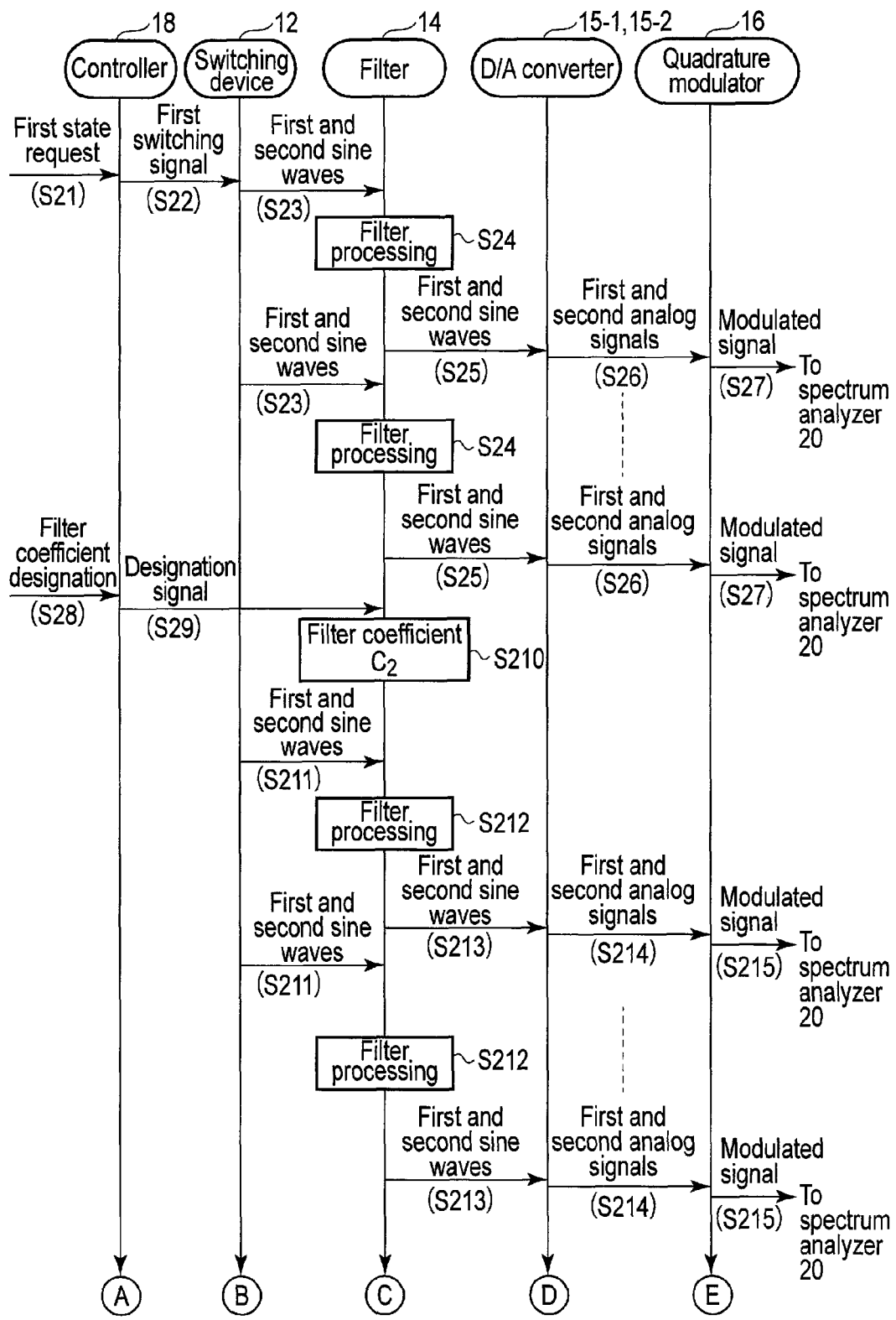
FIG. 2A is a sequence chart showing the first half of a sequence of causing the exciter shown in FIG. 1 to set a filter coefficient used to correct the skew difference of IQ signals.

In general, according to one embodiment, an exciter comprises a sine wave generator, a filter, a digital/analog converter, and a quadrature modulator. The sine wave generator generates a first sine wave and a second sine wave having a phase different from the phase of the first sine wave by 90° while changing a frequency in a predetermined step at a preset time interval. The filter stores a plurality of filter coefficients, sets one of the plurality of filter coefficients, and performs filter processing for the first sine wave and the second sine wave using the set filter coefficient. The digital/analog converter converts the first sine wave and the second sine wave after the filter processing into a first analog signal and a second analog signal, respectively. The quadrature modulator quadrature-modulates the first analog signal and the second analog signal and generates a modulated signal according to the frequency at which the first sine wave and the second sine wave are generated.

An embodiment will now be described with reference to the accompanying drawings.

FIG. 1 is a block diagram showing the functional arrangement of an exciter 10 according to this embodiment. The exciter 10 shown in FIG. 1 includes a modulation processor 11, a switching device 12, a sine wave generator 13, a filter 14, digital/analog converters 15-1 and 15-2, a quadrature modulator 16, a synthesizer 17, and a controller 18.

The modulation processor 11 performs transmission channel encoding processing and digital modulation processing for an input TS (Transport Stream) signal and converts the TS signal into an I signal and a Q signal in the baseband. The modulation processor 11 outputs the I signal and the Q signal to the switching device 12.

The sine wave generator 13 includes an NCO (Numerically Controlled Oscillator) 131 and a counter 132.

The NCO 131 creates a first sine wave having a frequency according to a set value phi set by the counter 132 and a second sine wave having a phase different from that of the first sine wave by 90°. The NCO 131 outputs created first and second sine waves to the switching device 12.

The counter 132 increments the set value phi in a predetermined step at a preset time interval and notifies the NCO 131 of the incremented set value phi. The predetermined step to increment the set value phi is a step in which the sine wave frequency difference generated by incrementing the set value phi does not exceed the resolution of a spectrum analyzer 20 and also meets a resolution desired by the operator. The counter 132 repetitively increments the set value phi in a band desired by the operator. For example, the counter 132 sets the set value phi that designates the maximum frequency in the desired band, and then increments the set value phi to the set value phi that designates the minimum frequency in the band.

The switching device 12 selectively outputs the I signal and the Q signal supplied from the modulation processor 11 or the first and second sine waves supplied from the sine wave generator 13 to the filter 14 in accordance with an instruction from the controller 18. That is, upon receiving, from the controller 18, a first switching signal that switches the outputs to the first and second sine waves, the switching device 12 outputs the first and second sine waves to the filter 14. Upon receiving, from the controller 18, a second switching signal that switches the outputs to the I signal and the Q signal, the switching device 12 outputs the I signal and the Q signal to the filter 14.

The filter 14 is, for example, an FIR (Finite Impulse Response) filter. A plurality of filter coefficients having delay differences necessary for a range and a resolution to correct an IQ skew difference are recorded in the internal memory of the filter 14 in advance. Note that the resolution means the minimum unit of the time difference for skew difference evaluation. For example, in 1 nsec, the filter coefficient is switched in 10 steps at an interval of 100 psec.

The filter 14 performs filter processing for the first and second sine waves supplied from the switching device 12 using, out of the plurality of filter coefficients, a filter coefficient according to a designation signal from the controller 18. An optimum filter coefficient is set based on the result of filter processing for the first and second sine waves.

The filter 14 also executes filter processing of the I signal and the Q signal supplied from the switching device 12 using a set filter coefficient out of the plurality of filter coefficients. The filter 14 outputs the signals after the filter processing to the digital/analog converters 15-1 and 15-2.

The digital/analog converters 15-1 and 15-2 convert the signals supplied from the filter 14 into first and second analog signals and output them to the quadrature modulator 16.

The quadrature modulator 16 modulates a carrier signal created by the synthesizer 17 by the first and second analog signals supplied from the digital/analog converters 15-1 and 15-2, composites the modulated carrier signals, and outputs the composite signal to the subsequent stage as a modulated signal. When the spectrum analyzer 20 is connected to the subsequent stage, as shown in FIG. 1, the quadrature modulator 16 outputs the modulated signal to the connected spectrum analyzer 20.

The influence of the skew difference of IQ signals on a quadrature error will be described below. Let us denote a transmission signal in the RF (Radio Frequency) band (frequency $f_c = \omega_c/2\pi$) by

[Equation 1]

$$\tilde{x}_{RF}(t) = x_I(t) \cos(\omega_c t) - x_Q(t) \sin(\omega_c t) \qquad (1)$$

At this time, assume that the Q channel side has a relative time difference $\Delta t$ with respect to the I channel side. In this case, the transmission signal is given by

[Equation 2]

$$\tilde{x}_{RF}(t) \cos(\omega_c t) - x_Q(t+\Delta t) \sin(\omega_c t) \qquad (2)$$

Spectrum analysis is performed for the transmission signal. When the Fourier transform result of the time signal of the I channel is given by

[Equation 3]

$$F[x_I(t)] = X_I(\omega) \qquad (3)$$

and the Fourier transform result of the time signal of the Q channel is given by

[Equation 4]

$$F[x_Q(t)] = X_Q(\omega) \qquad (4)$$

the Fourier transform result of the transmission signal is given by

[Equation 5]

$$\tilde{X}_{RF}(\omega) = F[\tilde{x}_{RF}(t)] = \int \tilde{x}_{RF}(t) e^{-j\omega t} dt = X_I(\omega-\omega_c) + jX_Q(\omega-\omega_c) e^{-j(\omega-\omega_c)\Delta t} + X_I(\omega+\omega_c) - jX_Q(\omega+\omega_c) e^{-j(\omega+\omega_c)\Delta t} \qquad (5)$$

Since $\omega < 0$, the third and fourth terms of equation (5) can be neglected in the RF region after quadrature modulation. The second term of equation (5) is affected by the skew difference. As is apparent from the second term, a phase characteristic $e^{-j(\omega-\omega_c)\Delta t}$ is applied to the frequency domain signal on the Q side. Since the phase of the frequency domain signal on the Q side shifts by $e^{-j(\omega-\omega_c)\Delta t}$, the signal on the I side and the signal on the Q side do not cancel each other, although they should do so originally, and an image is consequently generated.

When the operator requests the exciter 10 to attain a first state in which a filter coefficient can be set, the controller 18 creates the first switching signal for outputting the first and second sine waves to the filter 14 and outputs the first switching signal to the switching device 12.

When the operator designates a filter coefficient in the first state, the controller 18 creates a designation signal for notifying the filter 14 of the designated filter coefficient and outputs the designation signal to the filter 14.

When the operator requests the exciter 10 to attain a second state in which filter processing is performed using a set filter coefficient, the controller 18 creates the second switching signal for outputting the I signal and the Q signal to the filter 14 and outputs the second switching signal to the switching device 12.

When the modulated signal is supplied from the exciter 10, the spectrum analyzer 20 performs spectrum analysis for the supplied modulated signal, and displays the analysis result. The operator refers to the analysis result and designates a filter coefficient for the exciter 10. In addition, the operator refers to the analysis result and requests the exciter 10 to switch its state to the second state.

An operation of the exciter 10 having the above-described arrangement for setting the filter coefficient to correct the skew difference of IQ signals will be described next.

Figure 2B:
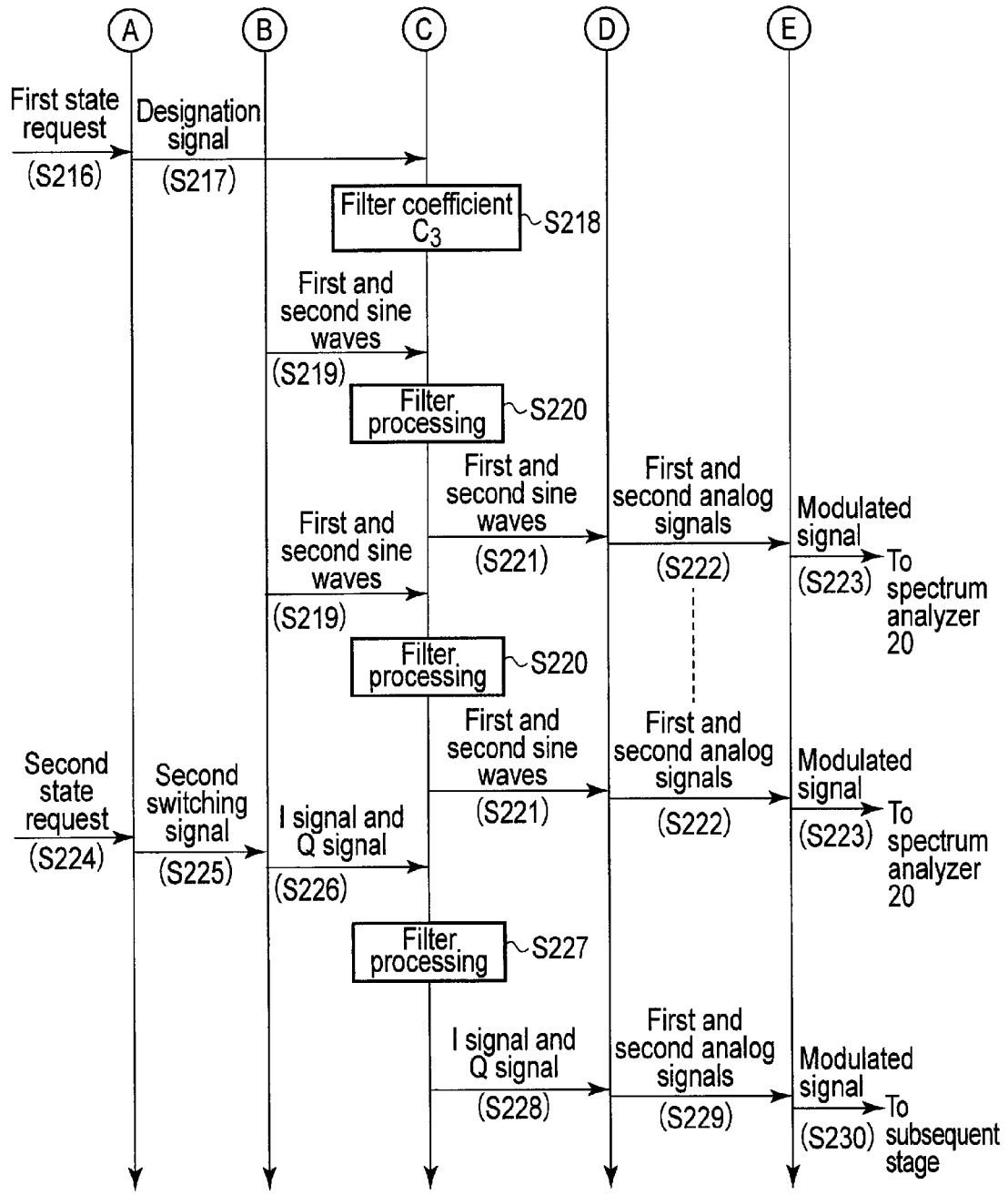
FIG. 2B is a sequence chart showing the second half of a sequence of causing the exciter shown in FIG. 1 to set a filter coefficient used to correct the skew difference of IQ signals.

FIGS. 2A and 2B are sequence charts when the exciter 10 according to this embodiment sets a filter coefficient used to correct the skew difference of IQ signals.

Referring to FIG. 2A, when the operator requests the first state in which a filter coefficient can be set (sequence S21), the controller 18 outputs the first switching signal to the switching device 12 so as to output the first and second sine waves generated by the sine wave generator 13 to the filter 14 (sequence S22).

The switching device 12 outputs the first and second sine waves of a frequency f1 generated by the sine wave generator 13 to the filter 14 (sequence S23).

The filter 14 performs filter processing of the first and second sine waves of the frequency f1 using a currently set filter coefficient C1 (sequence S24), and outputs the first and second sine waves after the filter processing to the digital/analog converters 15-1 and 15-2 (sequence S25).

The digital/analog converters 15-1 and 15-2 convert the first and second sine waves after the filter processing into first and second analog signals and output them to the quadrature modulator 16 (sequence S26).

The quadrature modulator 16 quadrature-modulates the first and second analog signals and outputs the modulated signal to the spectrum analyzer 20 (sequence S27).

Figure 3:
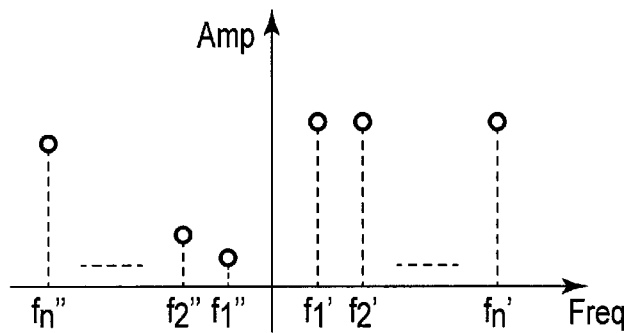
FIG. 3 is a graph showing the spectrum of a modulated signal displayed on a spectrum analyzer shown in FIG. 1.

The exciter 10 repeats the processes of sequences S23 to S27 while incrementing the set value phi and changing the frequency to f1 to fn. By the processes of sequences S23 to S27, the spectrum analyzer displays a spectrum shown in FIG. 3. Referring to FIG. 3, f1' and f1" are acquired in sequences S23 to S27 at the frequency f1, f2' and f2" are acquired in sequences S23 to S27 at the frequency f2, and fn' and fn" are acquired in sequences S23 to S27 at the frequency fn. The spectrum of the positive frequencies f1' to fn' represents the spectrum of a modulated signal including no quadrature error. Since the modulated signal including no quadrature error has no frequency characteristic, the spectrum does not change the amplitude even when the frequency changes. On the other hand, the spectrum of the negative frequencies f1" to fn" represents the spectrum of quadrature error components. Since the quadrature error components have a frequency characteristic, the spectrum changes the residual image amount when the frequency changes.

The operator refers to the spectrum shown in FIG. 3, and designates a filter coefficient C2 for the exciter 10 so the residual image amount does not change depending on the frequency (sequence S28).

When the operator designates the filter coefficient C2, the controller 18 outputs a designation signal for designating the filter coefficient C2 to the filter 14 (sequence S29). The filter 14 changes the filter coefficient C1 to the filter coefficient C2 in accordance with the designation signal (sequence S210).

Figure 4:
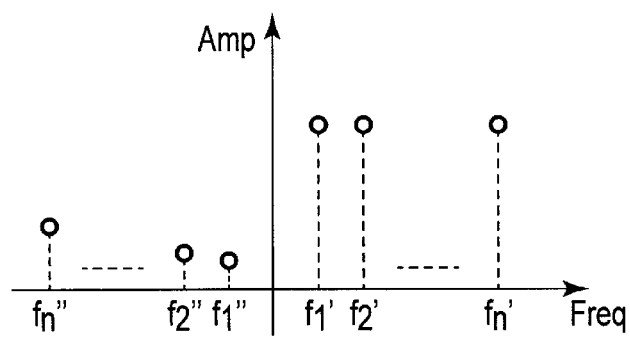
FIG. 4 is a graph showing the spectrum of a modulated signal displayed on the spectrum analyzer shown in FIG. 1.

The exciter 10 executes the processes of sequences S211 to S215 corresponding to sequences S23 to S27 for the first and second sine waves of the frequency f1 using the newly set filter coefficient C2. The exciter 10 repeats the processes of sequences S211 to S215 while incrementing the set value phi and changing the frequency to f1 to fn. By the processes of sequences S211 to S215, the spectrum analyzer displays a spectrum shown in FIG. 4. Referring to FIG. 4, f1' and f1" are acquired in sequences S211 to S215 at the frequency f1, f2' and f2" are acquired in sequences S211 to S215 at the frequency f2, and fn' and fn" are acquired in sequences S211 to S215 at the frequency fn. When the skew difference of the IQ signals is partially corrected by switching the filter coefficient C1 to the filter coefficient C2, the gradient of the spectrum at the frequencies f1" to fn" shown in FIG. 4 is smaller than the gradient of the spectrum at the frequencies f1" to fn" shown in FIG. 3. Note that subsequent processing will be described with reference to FIG. 2B.

Referring to FIG. 2B, the operator refers to the spectrum shown in FIG. 4, and designates a filter coefficient C3 for the exciter 10 so the residual image amount does not change depending on the frequency (sequence S216).

When the operator designates the filter coefficient C3, the controller 18 outputs a designation signal for designating the filter coefficient C3 to the filter 14 (sequence S217). The filter 14 changes the filter coefficient C2 to the filter coefficient C3 in accordance with the designation signal (sequence S218).

Figure 5:
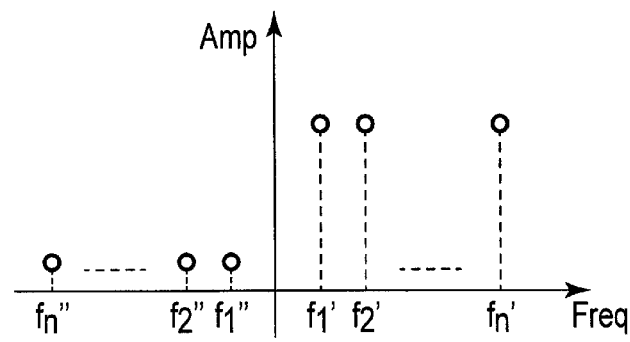
FIG. 5 is a graph showing the spectrum of a modulated signal displayed on the spectrum analyzer shown in FIG. 1.

The exciter 10 executes the processes of sequences S219 to S223 corresponding to sequences S23 to S27 for the first and second sine waves of the frequency f1 using the newly set filter coefficient C3. The exciter 10 repeats the processes of sequences S219 to S223 while incrementing the set value phi and changing the frequency to f1 to fn. By the processes of sequences S219 to S223, the spectrum analyzer displays a spectrum shown in FIG. 5. Referring to FIG. 5, f1' and f1" are acquired in sequences S219 to S223 at the frequency f1, f2' and f2" are acquired in sequences S219 to S223 at the frequency f2, and fn' and fn" are acquired in sequences S219 to S223 at the frequency fn. When the skew difference of the IQ signals is corrected by switching the filter coefficient C2 to the filter coefficient C3, the spectrum at the frequencies f1" to fn" shown in FIG. 4 does not change the residual image amount depending on the frequency.

Upon determining that the spectrum at the frequencies f1" to fn" does not change the residual image amount depending on the frequency, the operator requests the second state in which filter processing is performed using the filter coefficient C3.

When the operator requests the second state (sequence S224), the controller 18 outputs the second switching signal to the switching device 12 so as to output the I signal and the Q signal created by the modulation processor 11 to the filter 14 (sequence S225).

The switching device 12 outputs the I signal and the Q signal created by the modulation processor 11 to the filter 14 (sequence S226).

The filter 14 performs filter processing of the I signal and the Q signal using the filter coefficient C3 set by the processes of sequences S21 to S223 (sequence S227), and outputs the I signal and the Q signal after the filter processing to the digital/analog converters 15-1 and 15-2 (sequence S228).

The digital/analog converters 15-1 and 15-2 convert the I signal and the Q signal after the filter processing into first and second analog signals and output them to the quadrature modulator 16 (sequence S229).

The quadrature modulator 16 quadrature-modulates the first and second analog signals and outputs the modulated signal to the subsequent stage (sequence S230).

FIG. 6 is a graph showing the measurement result of an MER for each carrier, which is measured based on the modulated signal output from the quadrature modulator 16 in case where no optimum filter coefficient is set by the filter 14. FIG. 7 is a graph showing the measurement result of an MER for each carrier, which is measured based on the modulated signal output from the quadrature modulator 16 in case where an optimum filter coefficient is set by the filter 14. In FIGS. 6 and 7, the abscissa represents the carrier frequency [Hz], and the ordinate represents the amplitude [dB]. As is apparent from FIGS. 6 and 7, a residual image shown in FIG. 6 is eliminated in FIG. 7.

Note that an example in which the frequency of the first and second sine waves is changed to f1 to fn has been described with reference to the sequence charts of FIG. 2. However, if the frequency characteristic of the quadrature error can be confirmed halfway through the frequencies f1 to fn, the operator may designate a different filter coefficient even halfway through the frequencies f1 to fn.

As described above, according to this embodiment, the sine wave generator 13 generates the first and second sine waves while changing the frequency, and outputs the generated first and second sine waves to the filter 14 via the switching device 12. The filter 14 performs filter processing of the supplied first and second sine waves using a filter coefficient designated by the operator. The first and second sine waves after the filter processing undergo analog conversion and quadrature modulation, and the spectrum analyzer 20 displays the spectrum. While confirming the display of the spectrum analyzer 20, the operator designates a filter coefficient so as to eliminate the frequency characteristic of the quadrature error. The exciter 10 thus performs filter processing using a designated filter coefficient for the first and second sine waves created while changing the frequency, thereby causing the spectrum analyzer 20 to display the frequency characteristic of the quadrature error. For this reason, the operator can designate a filter coefficient capable of correcting the skew difference of IQ signals only by designating the filter coefficient so as to eliminate the frequency characteristic of the quadrature error displayed by the spectrum analyzer 20. The exciter 10 performs filter processing of the I signal and the Q signal using the thus designated filter coefficient and corrects the skew difference of the IQ signals.

Hence, according to the exciter 10 of this embodiment, it is possible to correct the skew difference without measuring the frequency characteristic of an MER, EMV, or the like using a special measuring device.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

While the embodiment of the inventions has been described, the embodiment has been presented by way of an example only, and is not intended to limit the scope of the inventions. Indeed, the embodiment may be embodied in a variety of other forms; furthermore, various omissions, substitutions and changes may be made without departing from the spirit of the inventions. The appended claims and their equivalents are intended to cover such forms or modifications as would fall within the scope and spirit of the inventions.

The invention claimed is:

1. An exciter comprising:
   a sine wave generator configured to generate a first sine wave and a second sine wave having a phase different from the phase of the first sine wave by 90.degree. while changing a frequency in a predetermined step at a preset time interval;
   a filter configured to store a plurality of filter coefficients, set one of the plurality of filter coefficients, and perform filter processing for the first sine wave and the second sine wave using the set filter coefficient;
   a digital/analog converter configured to convert the first sine wave and the second sine wave after the filter processing into a first analog signal and a second analog signal, respectively; and
   a quadrature modulator configured to quadrature-modulate the first analog signal and the second analog signal and generate a modulated signal according to the frequency at which the first sine wave and the second sine wave are generated,
   wherein the plurality of filter coefficients have delay differences necessary for a rangy e and a resolution to correct a skew difference of IQ signals in the quadrature modulator.

2. The exciter according to claim 1, further comprising a modulation processor configured to convert an input signal into an I signal and a Q signal in a baseband,
   wherein the filter performs the filter processing of the I signal and the Q signal using the filter coefficient suitable to correct a skew difference of IQ signals in the quadrature modulator, the filter coefficient being set based on a result of spectrum analysis of the modulated signal according to a plurality of frequencies,
   the digital/analog converter converts the I signal and the Q signal, which have undergone the filter processing, into a third analog signal and a fourth analog signal, respectively, and
   the quadrature modulator quadrature-modulates the third analog signal and the fourth analog signal.

3. The exciter according to claim 1, wherein the exciter is connectable to a spectrum analyzer.

4. A quadrature error correction method comprising:
   generating a first sine wave and a second sine wave having a phase different from the phase of the first sine wave by 90.degree. while changing a frequency in a predetermined step at a preset time interval;
   performing filter processing for the first sine wave and the second sine wave using a filter coefficient set out of a plurality of filter coefficients stored in advance, wherein the plurality of filter coefficients have delay differences necessary for a range and a resolution to correct a skew difference of IQ signals in a quadrature modulator;
   converting the first sine wave and the second sine wave after the filter processing into a first analog signal and a second analog signal, respectively;
   quadrature-modulating the first analog signal and the second analog signal and generating a modulated signal according to the frequency at which the first sine wave and the second sine wave are generated; and
   outputting the modulated signal according to a plurality of frequencies to a spectrum analyzer.

5. The quadrature error correction method according to claim 4, further comprising:
   when the filter coefficient suitable to correct a skew difference of IQ signals in the quadrature modulation is set based on a result of spectrum analysis of the modulated signal according to the plurality of frequencies by the spectrum analyzer, performing the filter processing using the set filter coefficient for an I signal and a Q signal in a baseband converted based on an input signal;
   converting the I signal and the Q signal after the filter processing into a third analog signal and a fourth analog signal, respectively; and
   quadrature-modulating the third analog signal and the fourth analog signal.

* * * * *